INVENTOR.
ERNST G. ZURFLUEH

United States Patent Office 3,490,032
Patented Jan. 13, 1970

3,490,032
METHOD AND APPARATUS UTILIZING A PAIR OF SPACED MAGNETOMETERS FOR MAKING MAGNETIC SURVEYS
Ernst G. Zurflueh, Pittsburgh, Pa., assignor to Gulf Research & Development Company, Pittsburgh, Pa., a corporation of Delaware
Filed Dec. 8, 1966, Ser. No. 600,208
Int. Cl. G01v 3/08
U.S. Cl. 324—8                                           14 Claims

ABSTRACT OF THE DISCLOSURE

Means to find relatively small magnetic anomalies as an indication of possible petroliferous deposits comprising the use of two high sensitivity magnetometers separated from each other by a known predetermined distance, correlating the readings of the two magnetometers, and transforming the resultant correlated readings to obtain total magnetic intensity free from time variations.

---

Figure 1:
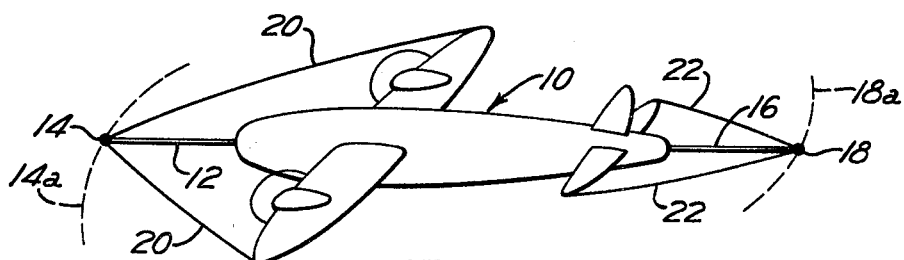

This invention relates to a method for measuring small magnetic rock bodies in the earth, or for detecting other magnetic bodies such as underwater submarines and the like; and to various apparatuses for carrying out the method.

The invention is characterized by the use of a pair of magnetometers displaced from each other by a known distance which are moved simultaneously along the direction determined by the imaginary line defined by said distance. As is well known to those skilled in this art, improvements in magnetometers have provided instruments of such increased sensitivity that it is now possible to detect anomalies much smaller than those detectable with equipment heretofore available.

This increased sensitivity can be used, for example, to directly detect structures in the sedimentary rocks of the earth. These sedimentary rocks, which overlie igneous and metamorphic rocks comprising the so-called "basement," have very small values of magnetization compared to "basement" rocks. One main advantage of these high sensitivity instruments used in the invention is that they allow measurement of heretofore undetectable changes in magnetization occurring in the sedimentary rocks. This is of particular importance in oil exploration, because the great majority of all petroleum and gas deposits are found in sedimentary rocks.

A problem inherent in magnetic field measurements made with one moving instrument is that one cannot distinguish between anomalies caused by magnetized objects such as rock masses in the ground, and time variations in the magnetic field which are always present. In particular, in aeromagnetic surveys, the most common form of magnetic surveying, it is impossible to separate small anomalies caused by sedimentary rocks from the equally small time variations of the magnetic field known as "pulsations" and "micropulsations." It is thus a primary object of this invention to eliminate the total time variation from the measurements of magnetic intensity so as to be able to discern these small anomalies.

The output curves of the two magnetometers are handled with respect to each other, by various means to be described below, to remove the total time variation, and to produce a single output curve similar to one of the input curves and completely free of all time variations. With the use of these improved high sensitivity magnetometers, it must be borne in mind that a magnetic feature of interest in the sedimentary layer can produce an anomaly having a size of the same order of magnitude as the size of the total time variation. Hence, use of a single high sensitivity instrument and electronic filtering means will not be able to discern the anomaly on the composite curve produced by the total time variation from anomalies produced by features of interest in the sedimentary layer.

The invention is suitable for use in the air to take flying surveys of relatively large land masses; with land vehicles to take more detailed surveys of land masses; for land surveys by occupying stations in an appropriate sequence; and with marine and submarine vehicles to take surveys of underwater land masses.

As a practical economic matter, magnetic surveys are generally made from airplanes, and therefore the following description will be primarily in terms of an air survey, but it will be understood that this is by way of example only and that the invention is applicable to surveys made from land vehicles or marine or submarine vehicles.

The time variations of magnetic intensity at two points on the earth separated by a relatively small distance will be identical at any instant since the two points are equidistant from the sources of the total time variation. The sun is the most important source of these time variations. In the preferred form of the invention, instrumentation on the vehicle will instantaneously subtract the two readings, one from the other, to yield a difference function which is free from time variations. The total intensity curve free of time variations is obtained by transformation of the difference curve by any known technique. Such techniques include integration, which may be performed by computers on land or on board the vehicle, or by summation in steps equivalent to the distance between the instruments, or by any other manner. The total intensity curve may then be smoothed in any well known manner, either on that curve or on any of the other curves to produce a final curve more accurate than the input curve. In order to adjust the level of the total intensity curve to actuality, and to compensate for linear gradients such as are introduced by instrument noise and the like, the beginning and end values, and intermediate values if desired, of the total intensity curve are tied to the same respective points of one of the original magnetometer records. This can be performed by computer.

Due to the fact that the total intensity curve is smoother than the difference curve, more smoothing or averaging can be used on the total intensity curve to eliminate instrument noise, so that the accuracy is higher than that of the difference curve thus multiplying the advantageous effect of eliminating all time variations. Vertical gradiometers cannot produce a single profile of total intensity, and therefore total intensity maps produced by vertical gradiometers are less accurate than those produced by the present invention. With vertical gradiometers, an area averaging must be used.

Because the total time variation is eliminated, the present invention has the advantage of being able to be used during magnetic storms, which, heretofore destroyed any meaningful data. This results in greater economy in magnetic surveying. Also, a large part of magnetic noise generated by engines and other parts of the airplane or vehicle is eliminated along with the total time variation.

The total time variation is the variation of the earth's magnetic field at one point with respect to time. The total time variation is composed of different fluctuations with different periods of oscillation. These variations can be classified as diurnal variations, pulsations, micropulsations and storms, and are caused by charged particles striking the earth and by the relationship between the sun and the earth. The variations are caused mostly by the sun, but at any point on the earth they can be modified by the magnetic configuration of the rock masses in the vicinity. Therefore, these variations change their character in different locations and cannot be eliminated from magnetic measurements by observing the variations in a different location. Therefore, the so-called "base station" methods of surveying will not produce meaningful results with these improved high sensitivity magnetometers because of this difference in total time variations from place to place. The term "base station" methods as used herein is intended to describe those surveying methods wherein either repeat observations are made of certain locations, or wherein another instrument is placed in a fixed position in the survey area and used to indicate the total time variation for the entire survey area.

Theoretically, increased accuracy would be obtained with the use of more than two magnetometers, but it is presently thought that the slight increase in accuracy would not justify the additional cost of the additional instruments and aligning apparatus.

Figure 2:
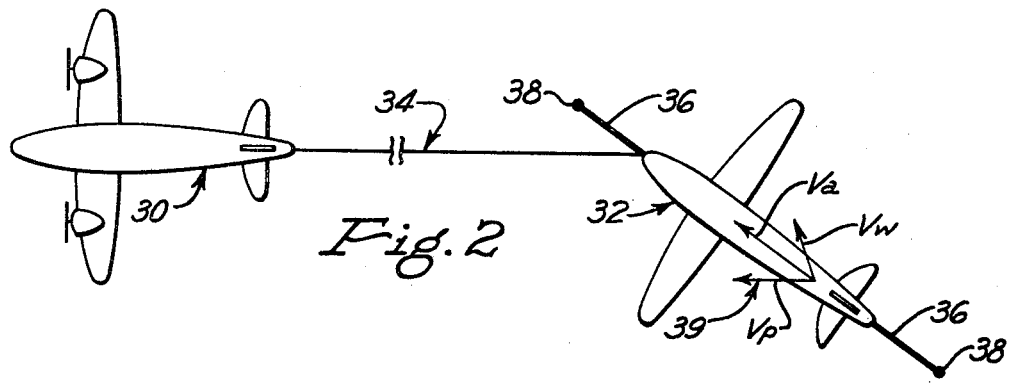
Figure 4:
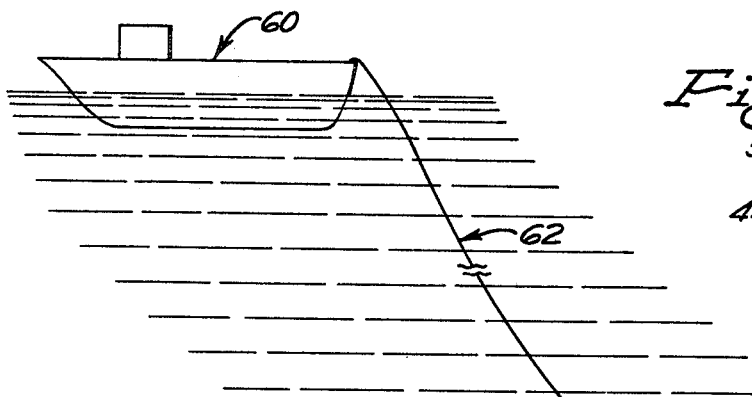
Figure 5:
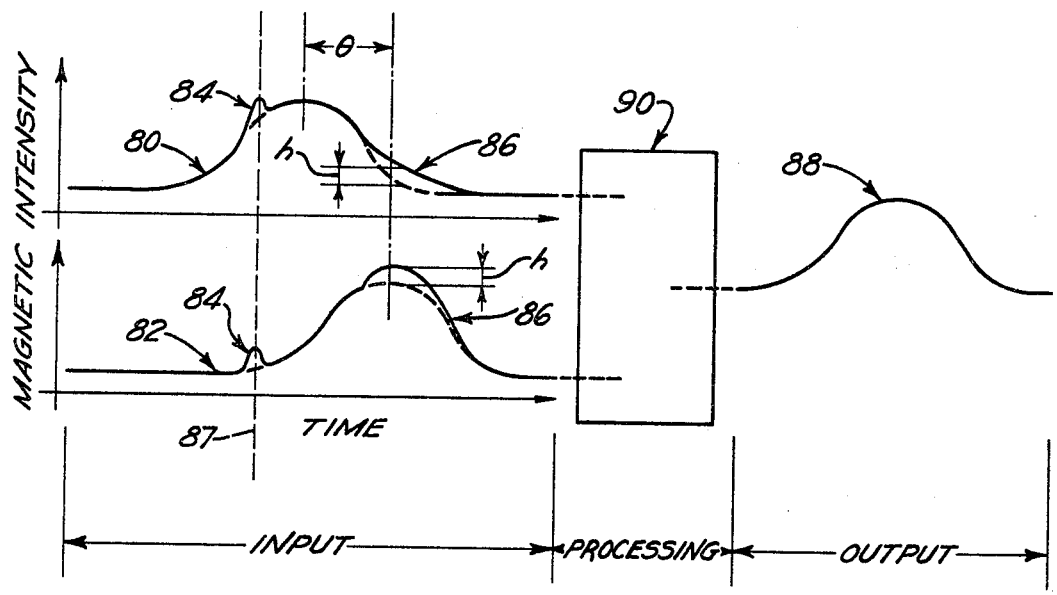

In the accompanying drawing forming a part of this disclosure: FIG. 1 is a perspective view of an airplane carrying an apparatus embodying the invention; FIG. 2 is a top plan view of an airplane towing a glider and constituting a second embodiment of the apparatus of the invention; FFIG. 3 is a top plan view of an alternate form of the glider; FIG. 4 is a vertical view of another embodiment of the apparatus of the invention adapted to make submarine magnetic surveys; and FIG. 5 is a diagram useful in explaining the operation of the invention.

Referring now in detail to the drawing, 10 designates an airplane of usual design. One airplane commonly used is a DC–3 having an engine mounted in each wing. Wing mounted engines are an advantage in that they permit the use of the nose of the plane for carrying a magnetometer. Extending forwardly from the nose of plane 10 is a "stinger" 12 or other rigid nonmagnetic support carrying a front magnetometer 14. Extending rearwardly from the tail of the plane is a "stinger" or support 16 carrying a rear magnetometer 18. Means are provided to stabilize the magnetometers 14 and 18, and to permit their motion about the horizontal arcs 14a and 18a, having their center points at the junction of each stinger and the nose or tail of the plane, respectively. To this end, a pair of cables 20 join magnetometer 14 to the outer tips of the wings, and a second pair of cables 22 join magnetometer 18 to the tips of the elevators of the tail assembly. Means not shown are provided to adjust the lengths of cables 20 and 22 to move magnetometers 14 and 18 along the arcuate paths 14a and 18a, respectively, shown in dotted lines. The lengths of stingers 12 and 16 are chosen and the point are such that the distance between magnetometers 14 and 18 will always be some known predetermined distance, preferably 100 feet.

It is essential that the known predetermined distance between the two magnetometers be maintained along the true flight path of the airplane with respect to the earth, in this embodiment. When the plane is flying parallel to the wind direction, no side correction by use of the cables is necessary. However, when the heading of the plane makes some angle with the wind direction, the true flight path of the plane will be the resultant, considering the situation as a vector situation, of the wind direction and the motion of the plane imparted to it by the engines. As is well known, when a plane flies at an angle to the wind there is a "crabbing" effect and the cables and swivel mechanism correct for this effect.

In order to correlate the resultant magnetic intensity data to the land mass over which the survey was taken, it is necessary that the vehicle, be it a land, air, or water vehicle, have its position known at the beginning point, at the end point, and at sufficient points in between, depending upon the nature of the survey, to make the data meaningful. In the case of an aircraft, the navigation may be performed by any conventional means, including a barometric or radar altimeter, or preferably a Shoran navigational system because of its high accuracy. Also, in aircraft means such as Doppler radar is useful to accurately determine the ground speed of the aircraft, which is needed to determine the time shift between the two magnetometer outputs. The navigation system may include such means. The Doppler radar and/or the navigation system is also helpful in determining the "crabbing" angle. In the case of a land vehicle, navigation can be performed by means of maps and landmarks, and with marine or submarine vehicles navigation can be performed by means of sonar and/or radar and maps. The resultant magnetic intensity data is then correlated with the navigational data to produce a magnetic intensity map or profile, which, of course, is the purpose of the magnetic survey.

In FIG. 2, there is shown an airplane 30 towing a glider 32 via tow and control cable 34. Glider 32 carries a pair of stingers 36 each carrying a magnetometer 38 at its outer end. The lengths of the glider and the stingers are such that the distance between magnetometers 38 is 100 feet. Cable 34 is made long enough so that the glider will not be buffeted severely by the slipstream of the plane and to isolate the magnetometers from the influence of the metal in the plane. The cable includes a strong core member to pull the glider, feed cables to feed the electrical signals from the magnetometers to the instrumentation on board plane 30, and control cables to control the rudder and elevators on the glider. Vector diagram 39 illustrates the correction for crabbing described above. Vector $V_p$ indicates the direction in which plane 30 is pointed, vector $V_w$ indicates the direction of the wind, and vector $V_a$ indicates the actual flight path of plane 30, which coincides with the direction in which glider 32 is pointed. Thus, magnetometers 38 are spaced apart 100 feet along the true flight path.

Figure 3:
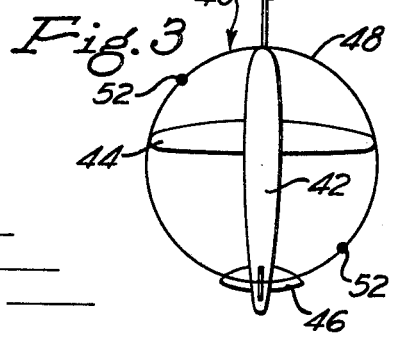

In FIG. 3 there is shown a plan view of a glider 40. Glider 40 comprises a central support member 42 carrying a wing 44, a tail assembly 46, and a ring member 48 having a diameter of 100 feet and supported by the wing, support member and tail assembly. A tow cable 50 similar to tow cable 34 of FIG. 2 is provided and includes means to control the elevators and rudder in tail assembly 46. Any other suitable means to keep glider 40 horizontal and parallel with the tow plane may be used. A pair of magnetometers 52 similar to magnetometers 38, and 14 and 18, are mounted on ring member 48, and include means to move simultaneously along the ring member to correct for crabbing as described above, while maintaining their predetermined separation.

In FIG. 4, there is shown an embodiment of the invention adapted to make submarine surveys. The apparatus comprises a surface vessel 60 (shown stylized) carrying a tow cable 62 to which is attached an assembly 64 comprising a rigid member 66 having a pair of magnetometers 68 mounted on opposite ends thereof. Preferably, member 66 is of a known predetermined length, at least 100 feet, but longer to give a larger difference between the readings. However, the distance cannot be so large that the two magnetometers will sense different time variations at the same instant. That is, the two instruments must sense the same time variation at the same instant of time. Rudder means, not shown, may be included on assembly 64 and controlled from boat 60 via cable 62 to correct for the effect of currents and tides which may cause an effect similar to the "crabbing" effect in the airborne apparatuses described above.

For surveys taken from land vehicles, many embodiments of apparatuses are possible, such as a truck and a trailer connected by a cable, or a rigid member of predetermined length carrying the magnetometers attached to one vehicle. Other possible embodiments of marine surveys include a non-magnetic dummy ship towed by a mother ship, that is, a water going version of the glider apparatuses. Similarly, since the only requirement as to the distance is that it be accurately known, the magnetometers could be individually towed by cables when moving through air or water with some means to accurately know the distance between them.

There are several magnetometers available at present which are suitable for use with the various embodiments of the invention. One such magnetometer is described in an article entitled "Principles of Operation of the Rubidium Vapor Magnetometer" by Arnold L. Bloom in the January 1962 issue of "Applied Optics." Similar instruments are described in the articles "Instrument Details and Applications of a New Airborne Magmetometer" by Homer Jensen; and in "Some Results of Aeromagnetic Surveying With a Digital Cesium-Vapor Magnetometer" by Raoul I. Giret, both articles published in "Geophysics," Vol. 30, No. 5, 1965. These magnetometers measure total magnetic intensity, but it will of course be understood that the invention is applicable for use with other types of magnetometers that measure only a component, usually vertical, of total magnetic intensity.

Referring to FIG. 5, there is shown a schematic diagram illustrating the operation of the invention and the handling of the data common to all the embodiments of the invention described above. The curve 80 is the output curve of the lead magnetometer, and the curve 82 is the output curve of the trailing magnetometer. The curves 80 and 82 are plotted along an abscissa corresponding to time, and on one superimposed ordinate corresponding to magnetic intensity.

The two curves are offset from each other by an amount of time $\theta$ which is proportional to the distance between the magnetometers, and which is equal to the distance between the magnetometers divided by the speed of the vehicle. The distance $\theta$ is shown drawn from peak to peak between the two curves for reference purposes only, it being understood that the phase shift $\theta$ exists between any two corresponding points on the curves 80 and 82.

For purposes of illustration, the two curves 80 and 82 are shown including two separate time variations 84 and 86. The vertical line 87 is drawn through the time variation 84 as reflected in both curves 80 and 82 to indicate that each instrument will record any one time variation at the same instant of time. Attention is called to the fact that time variation 86, which is larger than variation 84, has distorted the curve produced by the feature of interest, indicated in dotted lines, differently in the case of curve 80 than for curve 82. This occurs because while the time variation is experienced by both instruments simultaneously, the part of the two curves of the feature of interest on which they are superimposed is different, and hence the resultant curve is different in each case. It should be noted, however, that the height $h$ by which the true curve is distorted is the same in both cases.

Means are provided to collate the two curves, to remove the total time variation, and to produce an output curve similar to one of the input curves but free of all time variations. These means include multi-channeled filtering, either digital or electronic, simple means to algebraically subtract the readings of the two magnetometers, by summation in steps equivalent to the distance between the instruments, or by any other suitable means. The various filtering means which could be used directly produce output curve 88. The other means, which are characterized by producing a gradient or difference function, require an integration or a summation, to produce the output curve 88.

All of the above data handling means are symbolized by the "black box" 90.

"Black box" 90 can comprise a computer, either on board the vehicle or on land, and means to smooth the final output curve 88.

In the case of multi-channel filtering, either digital or electroninc, the filter means include means to filter out the frequency components which occur simultaneously in time, and to pass those frequency components which occur off-set from each other by an amount substantially equal to $\theta$. It will of course be understood that by suitable choice of the filter parameters, time variations having a duration greater than $\theta$ can also be filtered out.

It is preferred to have "black box" 90 on board the vehicle to avoid errors which might get into the data if the calculations were performed later.

The preferred embodiment of the apparatus of "black box" 90 comprises means to simply take the difference between the two magnetometer readings instantaneously on board the vehicle. Such subtracting means are known in the art as an "adding circuit" or as a "differential amplifier." In the preferred embodiment, "black box" 90 also includes means to integrate the resultant difference function produced by the differential amplifier, to produce a total magnetic intensity curve free of total time variation. The advantage of this preferred embodiment is that it may be simply done on board the vehicle, and correlated with the navigational data immediately, thus avoiding errors likely to be produced if the navigational data were recorded, then correlated with the magnetic intensity readings at a later time.

While the invention has been described in some detail above, it is to be understood that this detailed description is by way of example only, and the protection granted is to be limited only within the spirit of the invention and the scope of the following claims.

I claim:

1. A method of making a magnetic survey comprising the steps of spacing two high sensitivity magnetometers a known distance apart sufficiently large that said magnetometers will detect any one magnetic feature sequentially, moving the two magnetometers by a vehicle over the portion of the earth to be surveyed parallel to said known distance, making a separate reading with each of said magnetometers to produce two separate output signals, producing a record of the output signal of at least one of said magnetometers, taking navigational readings simultaneously with the production of said at least one record, correlating and transforming said at least one of said output signals and said at least one record produced therefrom with the output signal or record of the output signal of the other of said two magnetometers to produce a single record of total magnetic intensity free from total time variations, and adjusted to the actual level of magnetic intensity of said portion of the earth being surveyed and correlating the total magnetic intensity record with the navigational readings.

2. The method of claim 1, said step of correlating and transforming comprising subtracting the signal of one of the magnetometers from the signal of the other magnetometer and integrating the difference function obtained in said subtraction and tying the integrated difference function to said record of the output signal of said at least one of said magnetometers.

3. Apparatus for making a magnetic survey comprising a pair of high sensitivity magnetometers to provide separate output signals, means coupled to said magnetometers to produce at least one separate record of at least one of said signals, means to space said magnetometers a known distance apart sufficiently large that said magnetometers will detect any one magnetic feature sequentially, means to move said mangetometers parallel to the line established by said distance, navigation means to give the position of the magnetometers with respect to the portion of the earth being surveyed, means to subtract the output signal of one of the magnetometers from the output signal of the other magnetometer, means to integrate the difference function obtained from said subtraction means to produce a record of total magnetic intensity free of total time variations, and means to tie said record of total magnetic intensity free of total time variations to said at least one separate record of said at least one of said magnetometer output signals whereby said record of total magnetic intensity free of total time variations is adjusted to the actual level of magnetic intensity of said portion of the earth being surveyed.

4. The combination of claim 3, said signal subtracting means comprising a differential amplifier.

5. The combination of claim 3, said magnetometer moving means including an airplane, and said known distance spacing means comprising a pair of magnetometer support members extending from said airplane.

6. The combination of claim 5, means to mount each of said support members on said airplane to permit rotation of each support member and the magnetometer mounted thereon about the junction point between each support member and said airplane, and means to control the position of each of said support members about said junction point to maintain said known distance parallel to the actual flight path of the airplane.

7. The combination of claim 5, said navigation means comprising a Shoran navigational system.

8. The combination of claim 3, said known distance spacing means comprising a magnetometer carrying vehicle, said moving means comprising a second vehicle, and attaching means to attach said magnetometer carrying vehicle to said second vehicle, whereby said second vehicle causes said first vehicle to move.

9. The combination of claim 8, said first vehicle comprising a glider, said second vehicle comprising an airplane, and said attaching means comprising a tow and control cable, whereby the flight of said glider may be controlled on board said airplane.

10. The combination of claim 6, said navigation means comprising a Shoran navigational system.

11. The combination of claim 5, said first vehicle comprising a glider including a ring of predetermined diameter, means to move said magnetometers simultaneously around said ring, said second vehicle comprising an airplane, and attaching means to connect said glider to said airplane, whereby said airplane will tow said glider, and whereby said magnetometers may be moved around said ring so that the direction defined by the imaginary line joining them is parallel to the actual flight path of said airplane.

12. The combination of claim 5, said first vehicle comprising a straight, rigid member of predetermined length, said predetermined length having a value equal to said known distance, said second vehicle comprising a boat, and attaching means joining said member to said boat, whereby said member may be moved through the water at a distance below the surface dependent upon the length of said attaching means to survey the underwater surface of the earth below said member.

13. Apparatus for making a magnetic survey comprising a pair of high sensitivity magnetometers, means to establish said magnetometers a known distance apart, means to move said magnetometers along the line established by said distance, navigation means to give the position of the magnetometers with respect to the portion of the earth being surveyed, means to correlate the readings of the two magnetometers and to transform the correlated reading into a reading of total magnetic intensity free of total time variations, said magnetometer moving means including an airplane, said known distance establishing means comprising a pair of magnetometer support members extending from said airplane, means to mount each of said support members on said airplane to permit rotation of each support member and the magnetometer mounted thereon about the junction point between each support member and said airplane, and means to control the position of each of said support members about said junction point to maintain said known distance parallel to the actual flight path of the airplane.

14. Apparatus for making a magnetic survey comprising a pair of high sensitivity magnetometers, means to establish said magnetometers a known distance apart, means to move said magnetometers along the line established by said distance, navigation means to give the position of the magnetometers with respect to the portion of the earth being surveyed, means to correlate the readings of the two magnetometers and to transform the correlated reading into a reading of total magnetic intensity free of total time variations, said known distance establishing means comprising a magnetometer carrying vehicle, said moving means comprising a second vehicle, attaching means to attach said magnetometer carrying vehicle to said second vehicle, whereby said second vehicle causes said first vehicle to move, said first vehicle comprising a glider including a ring of predetermined diameter, means to move said magnetometers simultaneously around said ring, said second vehicle comprising an airplane, and attaching means to connect said glider to said airplane, whereby said airplane will tow said glider, and whereby said magnetometers may be moved around said ring so that the direction defined by the imaginary line joining them is parallel to the actual flight path of said airplane.

References Cited

UNITED STATES PATENTS

| | | | |
|---|---|---|---|
| 2,535,068 | 12/1950 | Johnson | 324—43 XR |
| 2,856,579 | 10/1958 | Packard | 324—43 XR |
| 2,891,216 | 6/1959 | Linder | 324—43 |
| 3,188,560 | 6/1965 | Hings | 324—8 |
| 3,263,161 | 7/1966 | Ruddock et al. | 324—8 |
| 2,635,134 | 4/1953 | Jenny | 324—8 |
| 2,692,970 | 10/1954 | Tolles | 324—4 XR |
| 2,696,602 | 12/1954 | Evans | 324—8 XR |
| 2,966,853 | 1/1961 | Gilfillan et al. | |
| 3,015,060 | 12/1961 | McLauglin et al. | 324—4 |
| 3,020,470 | 2/1962 | Shawhan et al. | 324—3 |
| 3,023,359 | 2/1962 | Jenny et al. | 324—4 |
| 3,042,857 | 7/1962 | Ronka | 324—6 XR |
| 3,052,837 | 9/1962 | Arbogast et al. | 324—3 |
| 3,123,766 | 3/1964 | Ruddock et al. | 324—6 XR |
| 3,274,488 | 9/1966 | Washkurak et al. | 324—8 |

GERARD R. STRECKER, Primary Examiner

U.S. Cl. X.R.

324—3, 4